J. & G. H. Bliss,

Tripod.

No. 103,417.  Patented May 24, 1870.

Witnesses:
Harold Serrell
Geo. D. Walker

John Bliss
Geo. H. Bliss
per L. W. Serrell
Atty

United States Patent Office.

JOHN BLISS AND GEORGE H. BLISS, OF BROOKLYN, NEW YORK.

Letters Patent No. 103,417, dated May 24, 1870.

IMPROVEMENT IN STANDS FOR TRANSIT INSTRUMENTS.

The Schedule referred to in these Letters Patent and making part of the same.

*To all whom it may concern:*

Be it known that we, JOHN BLISS and GEORGE H. BLISS, of Brooklyn, in the county of Kings and State of New York, have invented and made an Improvement in Stands or Foundations of Transit Instruments; and we do hereby declare the following to be a correct description of the same.

Instruments of a portable nature, for correcting time by transit observations, have heretofore been constructed with a frame, in the bottom of which are three points on which the instrument rests, but when so constructed the observer (or operator) must prepare his own base or foundation on which the transit instrument immediately rests, such preparation being attended with much inconvenience.

It is usual to make such a foundation of stone or a pillar in a detached location, in order that the instrument may not be exposed to vibration, or thrown out of adjustment.

In a transit instrument it is necessary that the telescope swing in the true meridian line. To adjust the instrument it is, therefore, necessary that the axis of the instrument should stand perfectly level and at right angles to the true north and south line.

The first-named adjustment is usually effected by a set-screw and level, the instrument standing upon three points, of which the adjusting-screw forms one.

To effect the second adjustment, the instrument usually is moved about upon a horizontal stone, and marks made where the said three points stand, when the instrument is set with the axis at right angles to the meridian; then holes are bored in said stone, and brass pegs inserted, leaded in and filed off level; then the transit instrument is again brought and its adjusting points set upon said brass pegs, the instrument adjusted, and the exact position of the said adjusting points designated, the instrument removed, and small holes bored in said pegs, so that the transit instrument may be brought to place and adjustment by simply placing the points in said holes.

The proper adjustment of a transit instrument, as aforesaid, it will be seen, is a work of difficulty, involving as it does so many repetitions of the operation described and the necessary calculations. It is expensive, and, in case of the stone or support being disturbed by frost or otherwise, the readjustment is almost impossible.

Our invention is to remove these difficulties by providing a bed for the transit instrument to rest upon, and which forms a part of the complete instrument, in order to save the operator the trouble of preparing a foundation himself, and which, when finally adjusted in its position, shall be stationary, but made with special reference to the easy removal of the transit-frame and telescope to a place of shelter.

In order to effect this object, we construct two circular plates, the lower one being firmly attached to a stone, a tree, stump, or other firm support, the upper one being connected thereto by a clamping-screw, and capable of being rotated, and containing the points or sockets corresponding to the sockets or points at the lower part of the frame of the transit; and Our invention is particularly designed to facilitate what has been described in the foregoing as the "second adjustment;" hence, to adjust the transit accurately, it is only necessary to secure the lower plate firmly to some suitable support, apply the upper plate and transit instrument, and then level the said axis by the adjusting-screw, and then turn the instrument and the upper bed until the line of collimation in the instrument bisects any heavenly body, when in the meridian, preferably the Polar star or other circumpolar star.

The upper plate of the bed is then clamped firmly to the lower bed, and remains in position, and the transit instrument can be lifted off and taken to a place of shelter, as described.

By our construction of bed, the adjustment can be effected in a few minutes at any time when such a heavenly body, as mentioned, is on the meridian, and that with the greatest accuracy, without any repetition of operation, and any ordinary watch-maker or a mechanic can, by following simple rules, set up the transit instrument so as to give true time with the greatest accuracy.

In the drawing—

Figure 1:
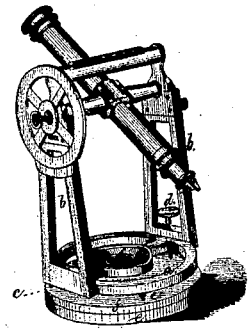
Figure 1 is a perspective view of the transit and its bed-plates.
Figure 2:
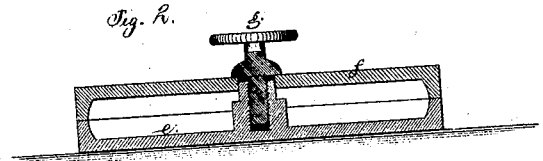
Figure 2 is a vertical section of the bed-plates.
Figure 3:
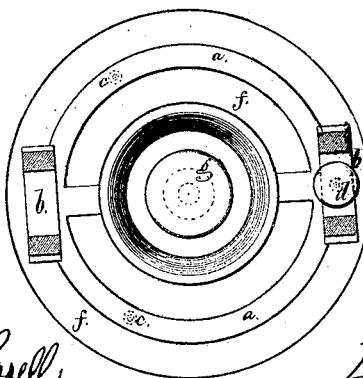
Figure 3 is a plan showing the lower part of the transit-instrument frame and the said bed-plates, and the position of the points and corresponding sockets therein.

$a$ represents the ring upon which the side-frames $b$ of the transit instrument are placed.

$c\ c$ are the fixed points or sockets upon the ring $a$, resting in the corresponding sockets or points in the upper plate $f$; and $d$ is the adjusting-screw.

These parts, excepting the plate, as a whole, form the transit instrument, that is removable from the bed formed by the plates $e$ and $f$, that are connected by the clamping-screw $g$.

The plate $e$ is to be firmly attached to a support by screws passing through it or otherwise, and the plate $f$ has, in or on its surface, the points or sockets for the socket or points $c\ c$ and screw $d$ of the transit.

The plate $f$ can be turned around horizontally, as aforesaid, to adjust the transit instrument so that it swings in the plane of the meridian, and then the same is firmly clamped by the screw $g$.

This construction facilitates the setting up and adjustment aforesaid, and, with our improved base, if its position becomes changed from any of the causes named, the telescope can easily be brought again into the plane of the meridian by loosening the screw $g$ and slightly rotating the upper plate $f$.

We do not claim the rotary character of the upper plate, because that is already peculiar to theodolites and surveying instruments, in which the instruments are permanently attached to the upper plate.

We claim as our invention—

The plate $f$, containing sockets or points and clamped to the plate $e$ by the screw $g$, in combination with the removable transit instrument and adjusting-screw $d$, substantially as specified, whereby the bed for the removable transit instrument is adjusted with facility and accuracy, as and for the purposes specified.

JOHN BLISS.
GEO. H. BLISS.

Witnesses:
EDWIN MORGAN,
SAMUEL W. BLISS.